(12) United States Patent
Nimura (10) Patent No.: US 9,992,367 B2
(45) Date of Patent: Jun. 5, 2018

(54) IMAGE FORMING APPARATUS

(71) Applicant: CANON KABUSHIKI KAISHA, Tokyo (JP)

(72) Inventor: Masanori Nimura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/381,472

(22) Filed: Dec. 16, 2016

(65) Prior Publication Data

US 2017/0180578 A1 Jun. 22, 2017

(30) Foreign Application Priority Data

Dec. 16, 2015 (JP) .................................. 2015-245099

(51) Int. Cl.
G06F 3/12 (2006.01)
H04N 1/00 (2006.01)

(52) U.S. Cl.
CPC ..... *H04N 1/00777* (2013.01); *H04N 1/00336* (2013.01); *H04N 1/00496* (2013.01); *H04N 1/00687* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,373,213 | B1 * | 4/2002 | Watanabe | B60K 35/00 318/445 |
| 7,787,794 | B2 * | 8/2010 | Yamada | G03G 15/5016 399/126 |
| 7,822,353 | B2 * | 10/2010 | Koike | B41J 29/38 399/126 |
| 9,069,392 | B2 * | 6/2015 | Tanaka | G06F 3/033 |
| 2002/0118395 | A1 * | 8/2002 | Isozaki | H04N 1/0461 358/400 |
| 2005/0185216 | A1 * | 8/2005 | Mitsuhashi | H04N 1/00496 358/1.15 |
| 2006/0171734 | A1 * | 8/2006 | Maeda | G03G 15/5016 399/81 |
| 2007/0075570 | A1 * | 4/2007 | Okada | E05F 15/41 296/216.01 |
| 2010/0165382 | A1 * | 7/2010 | Asano | G06K 9/00228 358/1.15 |

FOREIGN PATENT DOCUMENTS

JP 2007-81248 A 3/2007

* cited by examiner

*Primary Examiner* — Dung D Tran
(74) *Attorney, Agent, or Firm* — Canon U.S.A. Inc., IP Division (57) ABSTRACT

An image forming apparatus including a rotatable operation unit for information display and data input and configured to form an image on a sheet includes a tilt drive unit configured to rotate the operation unit, a tilt motor configured to drive the tilt drive unit, a volume sensor configured to detect a rotation position at which the operation unit is rotated, and a CPU configured to control rotation of the operation unit by driving the tilt motor based on a detection result acquired by the volume sensor, wherein the CPU prohibits a first rotation operation for rotating the operation unit to a predetermined position if the first rotation operation is not finished within a first predetermined time, and cancels the prohibition of the first rotation operation if a second rotation operation for rotating the operation unit to a standby position is finished within a second predetermined time.

3 Claims, 8 Drawing Sheets

IMAGE FORMING APPARATUS

BACKGROUND OF THE INVENTION

Field of the Invention

The present disclosure relates to an image forming apparatus such as a digital copy machine, a multifunction peripheral, and a laser printer, and more specifically, to tilt control of an operation unit.

Description of the Related Art

Some image forming apparatuses include operation units arranged on upper portions of housings. The operation unit includes a liquid crystal screen on which information is displayed or data is input. In a case where the operation unit is arranged in a higher position, a wheelchair user or a short user, for example, may have difficulty in looking at information displayed on the liquid crystal screen or difficulty in performing input operation due to poor visibility of the operation unit. Accordingly, there is an image forming apparatus including a tilt mechanism by which an angle of an operation unit can be manually adjusted to enhance visibility and usability of the operation unit. In recent years, a mechanism for automatically adjusting an angle of an operation unit has been discussed. Such a mechanism adjusts an angle of the operation unit to an angle at which a user can readily use the operation unit. For example, Japanese Patent Application Laid-Open No. 2007-81248 discusses an image forming apparatus that automatically rotates an operation unit when power of the image forming apparatus is turned on and off.

In the image forming apparatus automatically rotating the operation unit to a predetermined position when the power is turned, the operation unit may not be automatically rotated in some cases. Such a case occurs, for example, when a load is applied to a rotation mechanism by a user hand placed on the operation unit, or a large book document placed on a document reader unit interferes with rotation operation of the operation unit by projecting into the operation unit. If the automatic rotation of the operation unit continues even in such a case, noise is generated or the book document is damaged.

SUMMARY OF THE INVENTION

The present disclosure is directed to a technique capable of suppressing generation of noise or damage to a document when an operation unit is automatically rotated.

According to an aspect of the present disclosure, an image forming apparatus including a rotatable operation unit for information display and data input and configured to form an image on a sheet includes a rotation unit configured to rotate the operation unit, a drive unit configured to drive the rotation unit, a detection unit configured to detect a rotation position at which the operation unit is rotated, and a control unit configured to control rotation of the operation unit by driving the drive unit based on a detection result acquired by the detection unit, wherein the control unit prohibits execution of a first rotation operation for rotating the operation unit to a predetermined position if the first rotation operation is not finished within a first predetermined time, and cancels the prohibition of the execution of the first rotation operation if a second rotation operation for rotating the operation unit to a standby position is finished within a second predetermined time.

Further features of the present disclosure will become apparent from the following description of exemplary embodiments with reference to the attached drawings.

DESCRIPTION OF THE EMBODIMENTS

Exemplary embodiments will be described in detail below with reference to the drawings.

<Configuration of Image Forming Apparatus>

Figure 1:
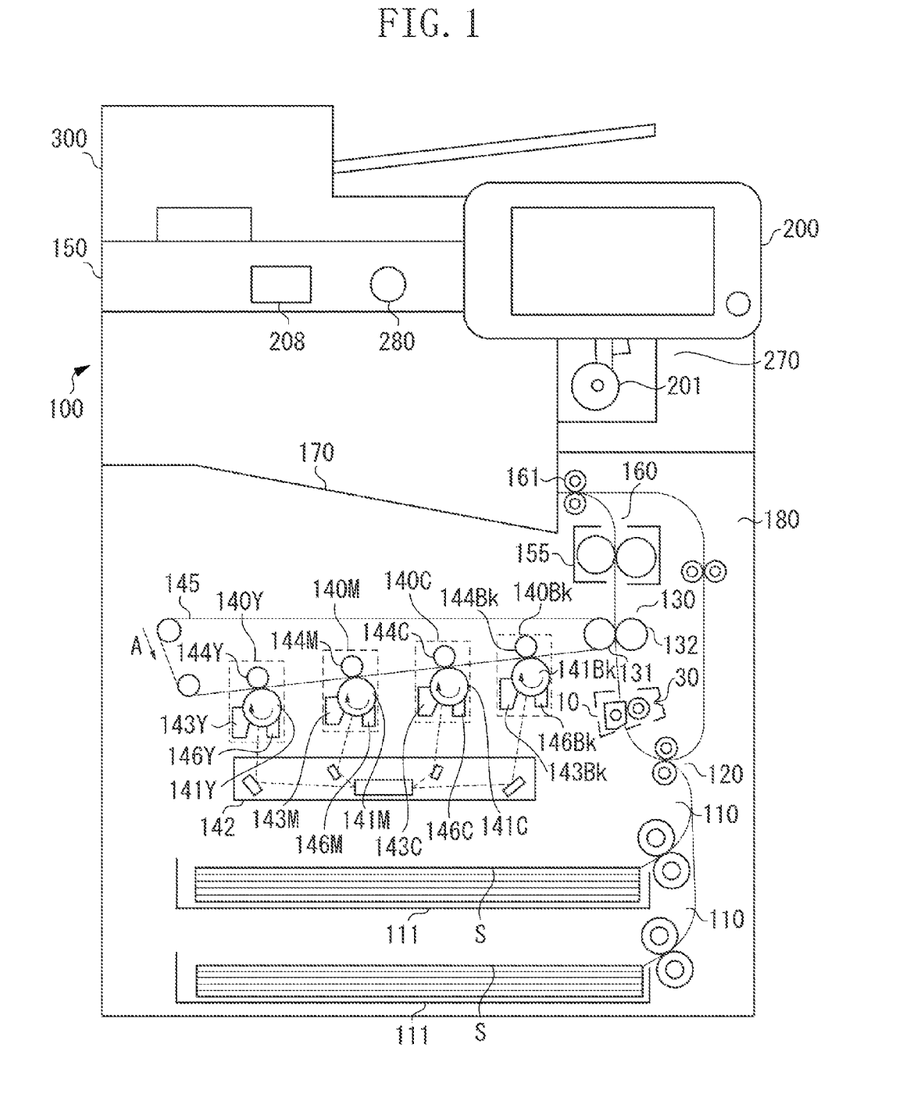
FIG. 1 is a schematic sectional diagram illustrating an image forming apparatus according to an exemplary embodiment.

FIG. 1 is a section diagram schematically illustrating an image forming apparatus 100 that forms an image with a plurality of color toners. The image forming apparatus 100 according to an exemplary embodiment is described with reference to FIG. 1. The image forming apparatus 100 includes four image-forming units 140Y, 140M, 140C, and 140Bk (broken-line portions in FIG. 1) for forming images of different colors. The image-forming units 140Y, 140M, 140C, and 140Bk form images with color toners of yellow, magenta, cyan, and black, respectively. The suffixes Y, M, C, and Bk to the numerical values respectively indicate yellow, magenta, cyan, and black. Hereinafter, the suffixes Y, M, C, and Bk are omitted except for description of a specific color.

The image forming apparatus 100 includes a cassette 111 and a document reader unit 150. The cassette 111 stores a sheet S serving as a recording medium on which an image is to be formed, and the document reader unit 150 reads a document placed on a platen glass. Further, the image forming apparatus 100 includes an automatic document feeder (ADF) 300 that is used when documents are successively read. When a document is copied, a user sets the document on the document reader unit 150 and inputs a copy instruction from an operation unit 200. Accordingly, the document reader unit 150 reads a document image. Upon reception of a copy instruction, a laser scanner unit 142 emits a laser beam according to image data of the read document to irradiate a photoconductive drum 141 with the laser beam. The document reader unit 150 includes a document size sensor (not illustrated) serving as a document detection unit that detects the presence or absence and size of a document on the platen glass. The document size sensor uses a photoelectric conversion element such as a chargecoupled device (CCD) sensor to receive light that is emitted from a light emitting diode (LED) as a light source and reflected from a document on the platen glass, thereby detecting the document on the platen glass. Further, the document size sensor determines the size of the document based on a sensor position at which the presence of the document is detected.

The image-forming unit 140 includes the photoconductive drum 141 serving as a photoconductor. A charging device 146, the laser scanner unit 142, and a developing device 143 serving as a development unit are arranged around the photoconductive drum 141. An intermediate transfer belt 145 (endless belt) is disposed above the photoconductive drum 141. The intermediate transfer belt 145 is tightly stretched by a drive roller and a driven roller. The intermediate transfer belt 145 rotates in a direction (a counterclockwise direction) indicated by an arrow A shown in FIG. 1 during image formation. Further, a primary transfer device 144 is disposed in a position opposing the photoconductive drum 141 via the intermediate transfer belt 145. The image forming apparatus 100 according to the present exemplary embodiment also includes a secondary transfer unit 130 and a fixing device 155. The secondary transfer unit 130 transfers a toner image on the intermediate transfer belt 145 to a sheet S serving as a recording medium, and the fixing device 155 fixes the toner image on the sheet S.

An image forming process performed by the image forming apparatus 100 is described. Since image forming processes in the respective image-forming units 140Y, 140M, 140C, and 140Bk are substantially the same, the image forming process in the image-forming unit 140Y is described as an example. A description of the image forming process in each of the image-forming units 140M, 140C, and 140Bk is omitted. The charging device 146Y of the image-forming unit 140Y charges the photoconductive drum 141Y rotating in a direction (a clockwise direction) indicated by an arrow illustrating in FIG. 1. The charged photoconductive drum 141Y is irradiated with a laser beam emitted from the laser scanner unit 142Y. This forms an electrostatic latent image on the rotating photoconductive drum 141Y (on the photoconductor). The electrostatic latent image formed on the photoconductive drum 141Y is developed as a yellow toner image by the developing device 143Y. Similar process is performed in each of the image-forming units 140M, 140C, and 140Bk.

The primary transfer devices 144 with a transfer voltage applied thereto transfer the toner images of the respective colors of yellow, magenta, cyan, and black formed on the photoconductive drums 141 of the respective image-forming units 140 to the intermediate transfer belt 145. In this way, the toner images of the respective colors are overlapped on the intermediate transfer belt 145. In other words, the toner image of four colors is transferred to the intermediate transfer belt 145.

On the other hand, sheets S stored in the cassette 111 are separated and fed one by one by a sheet feeding unit 110. The sheet S fed by the sheet feeding unit 110 is delivered to a pair of conveyance rollers 120, and then conveyed toward a sheet skew correction apparatus 10 disposed on a downstream side in a sheet conveyance direction. The sheet skew correction apparatus 10 corrects skew of the sheet S. Then, the sheet S is conveyed to the secondary transfer unit 130 by a pair of conveyance rollers 30. The toner image of four colors transferred to the intermediate transfer belt 145 is conveyed to the secondary transfer unit 130 including a secondary transfer roller 132 and a driven roller 131. Accordingly, the toner image of four colors on the intermediate transfer belt 145 is transferred to the sheet S conveyed to the secondary transfer unit 130 from the cassette 111.

The sheet S on which the toner image of four colors is transferred is conveyed to the fixing device 155 in which heat and pressure are applied to the unfixed toner images on the sheet S. Accordingly, a full-color image is fixed on the sheet S. After passing through the fixing device 155, the sheet S passes a conveyance unit 160 and is discharged to a discharge tray 170 by a discharge roller 161 when one-side printing is performed. On the other hand, when two-sided printing is performed, the discharge roller 161 is rotated in a reverse direction to convey the sheet S with the image formed on one side to a reversing conveyance device 180. A tilt drive unit 270, a tilt motor 201, a human detection sensor 280, and identification (ID) information reader unit 208 are described below.

<Operation Unit>

Figure 2A:
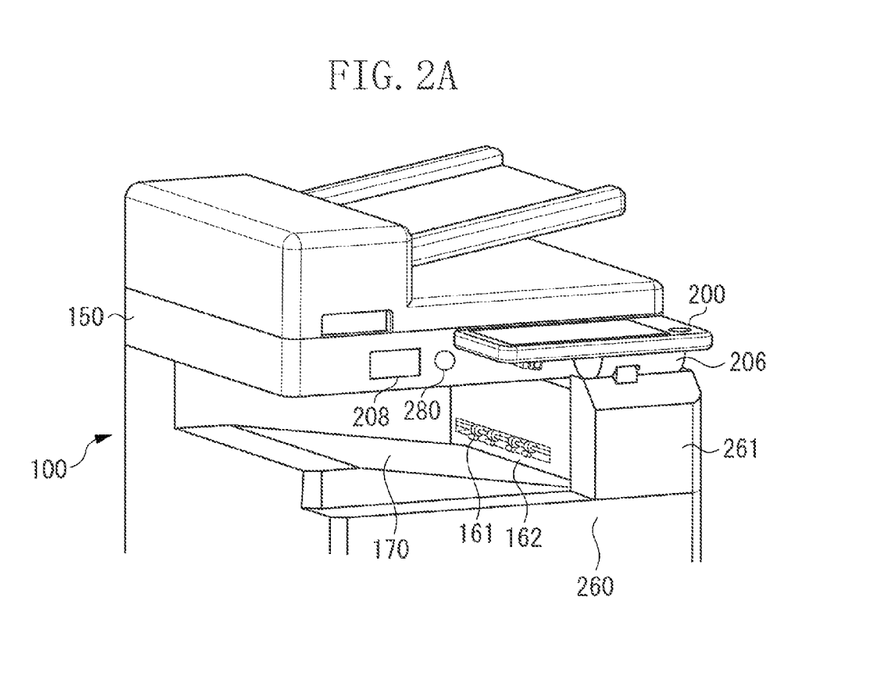
FIGS. 2A and 2B are perspective diagrams illustrating an arrangement of a drive unit for a tilt mechanism of an operation unit according to an exemplary embodiment.

The image forming apparatus 100 includes a tilt mechanism drive unit as a rotation unit by which the operation unit 200 can be rotated. Hereinafter, a position (disposed location) in which the tilt mechanism drive unit is disposed in the image forming apparatus 100 is described with reference to FIGS. 2A and 2B. Components similar to those described in FIG. 1 are given the same reference numerals as above and description thereof is omitted. FIG. 2A is a perspective view illustrating a periphery of the operation unit 200 in a state where the drive unit for a tilt mechanism is covered with an outer cover. The outer cover for covering the drive unit includes a frame cover 261 that entirely covers the drive unit and an operation unit bottom cover 262 that covers a joint portion between the drive unit and the operation unit 200. The frame cover 261 is disposed at an upper portion on the same side as a front cover 260 of the image forming apparatus 100. The frame cover 261 covers a frame between an image forming apparatus main body and the document reader unit 150. The operation unit bottom cover 262 covers a bottom surface (backside) of the operation unit 200.

Figure 2B:
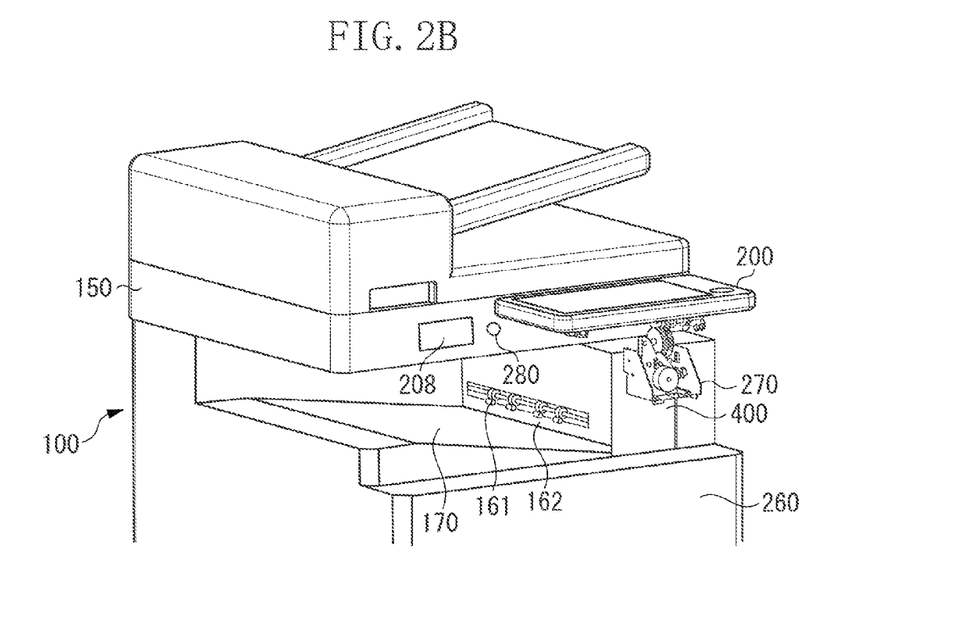

FIG. 2B is a perspective view illustrating a state where the frame cover 261 and the operation unit bottom cover 262 are removed from the state illustrated in FIG. 2A. As illustrated in FIG. 2B, a tilt drive unit 270 (hereinafter referred to as a drive unit 270) that drives the tilt mechanism is attached to a main body frame 400 at a front side. A location (a position) in which the drive unit 270 is disposed corresponds to a position above the fixing device 155 and the discharge roller 161 of the image forming apparatus main body. Normally, such space above the fixing device 155 does not have any unit and is a dead space. Even in a case where the drive unit 270 is attached to the main body frame 400 and then covered with the frame cover 261, the frame cover 261 is provided at the same height as the front cover 260. Thus, such arrangement of the drive unit 270 does not generate a projection projecting from the image forming apparatus 100. Consequently, the design of the image forming apparatus 100 is not affected. In addition, since the frame cover 261 does not project toward a discharge port 162 to which the sheet S is discharged, a view of the sheet S to be discharged on the discharge tray 170 is not blocked.

Further, the drive unit 270 is attached to the bottom surface (backside) of the operation unit 200, so that the operation unit 200 is rotated from a downward direction. Accordingly, the operation unit 200 can be disposed at an end portion of the document reader unit 150, thereby enhancing flexibility of design and arrangement on the periphery of the operation unit 200. Further, since the drive unit 270 is arranged in the image forming apparatus main body instead of the document reader unit 150, the tilt mechanism of the operation unit 200 can be readily attached to, for example, even a printer including no document reader unit 150.

<Tilt Mechanism of Operation Unit>

Figure 3A:
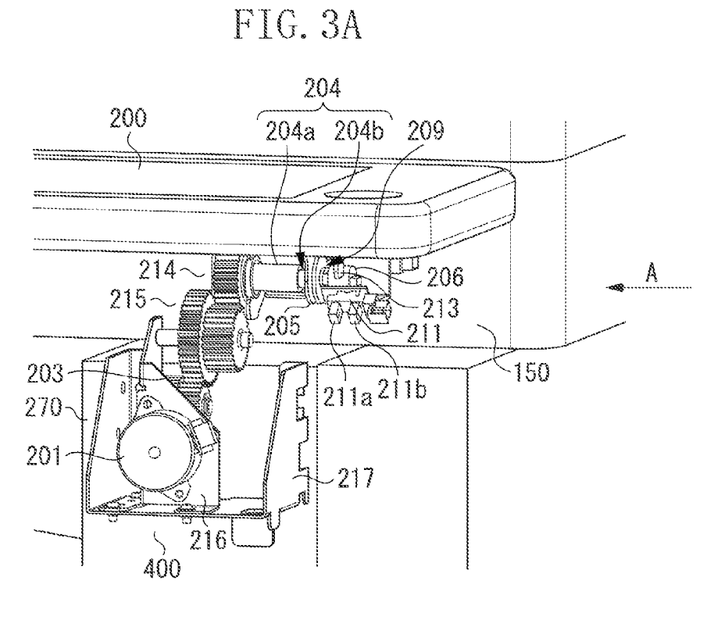
FIGS. 3A and 3B are diagrams illustrating a main portion of a tilt mechanism of the operation unit according to an exemplary embodiment.
Figure 3B:
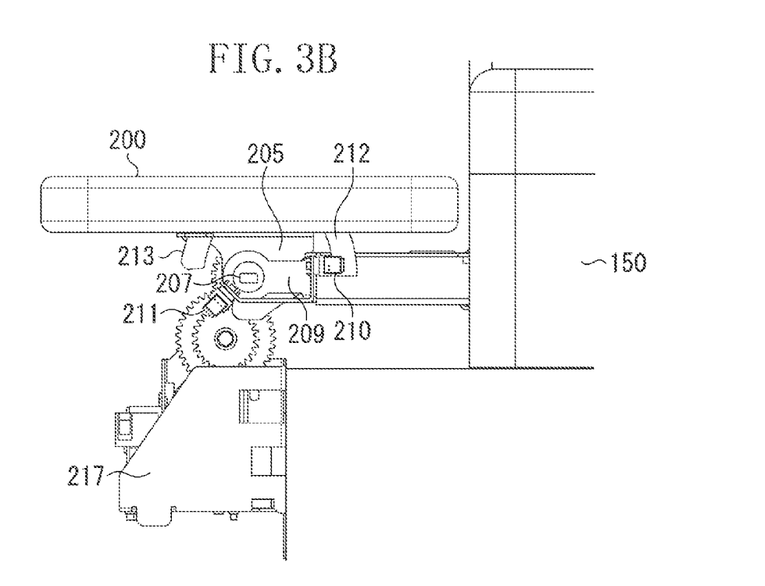
Figure 4A:
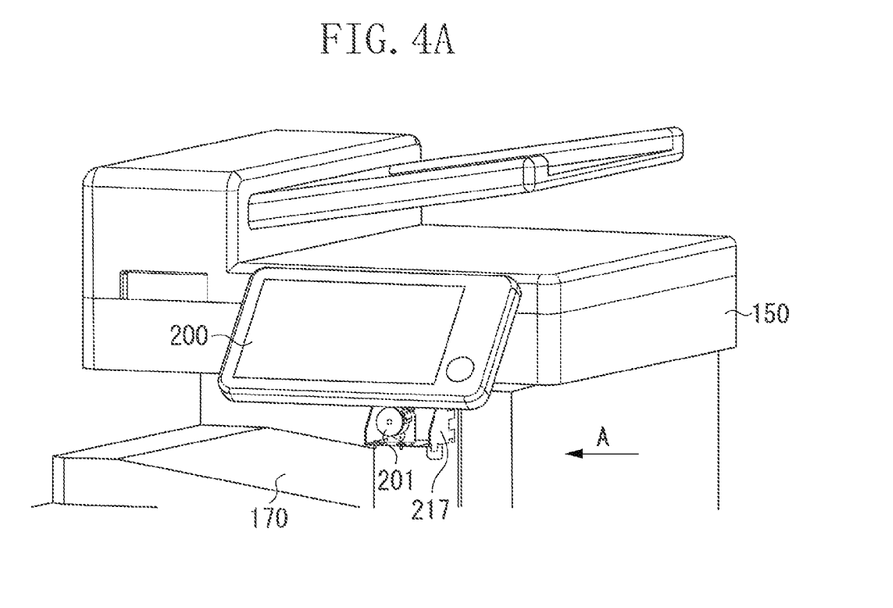
FIGS. 4A and 4B are diagrams illustrating the main portion of the tilt mechanism of the operation unit according to an exemplary embodiment.
Figure 4B:
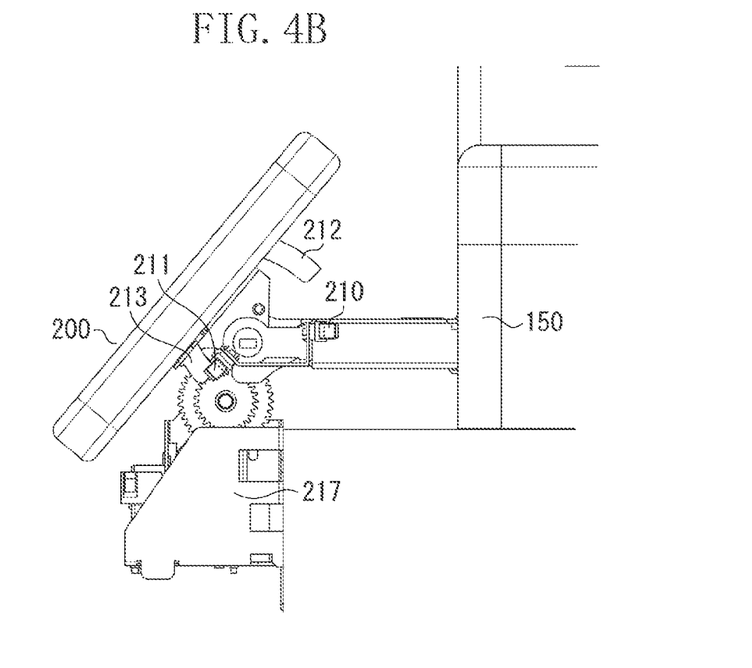

Next, the drive unit for the tilt mechanism of the operation unit 200 according to the present exemplary embodiment is described in detail with reference to FIGS. 3A, 3B, 4A, and 4B. FIG. 3A is an enlarged perspective view illustrating a main portion of the tilt mechanism of the operation unit 200 and a periphery thereof when the operation unit 200 is at a home position in a substantially horizontal state. FIG. 3B is a side view of the state illustrated in FIG. 3A as seen from a direction A illustrated in FIG. 3A. Similarly, FIG. 4A is an enlarged perspective view illustrating the main portion of the tilt mechanism of the operation unit 200 and the periphery thereof when maximum rotation is made by the operation unit 200. FIG. 4B is a side view of the state illustrated in FIG. 4A as seen from a direction A illustrated in FIG. 4A.

As illustrated in FIG. 3A, the operation unit 200 includes a liquid crystal screen and operation buttons. A user can issue a print instruction and set an environment of the image forming apparatus 100 via the operation unit 200. Further, the user can register a setting at the time of ID authentication described below via the operation unit 200.

A support plate 217 of the drive unit 270 is disposed under the operation unit 200. The support plate 217 integrally supports a tilt motor 201 (hereinafter referred to as a motor 201), a motor support plate 216, a step gear 203, and a gear 215. The support plate 217 of the drive unit 270 is fixed to the main body frame 400 with a screw. Since the drive unit 270 is provided as a unit, assemblability is facilitated and replacement workability is enhanced. In the drive unit 270, the motor 201 is fixed to the motor support plate 216, and a motor shaft gear of the motor 201 includes a worm gear 202 having an inclined groove-shaped gear. The step gear 203 includes a worm wheel portion and a spur gear portion. The worm wheel portion meshes with the worm gear 202 of the motor shaft of the motor 201, whereas the spur gear portion meshes with the gear 215. The gear 215 meshes with a gear 214 disposed in the rotation center of the operation unit 200. Therefore, drive rotation of the motor 201 is transmitted to the gear 214.

A torque limiter 204 includes a housing 204a and a shaft 204b. When a predetermined amount of torque or more is applied to the torque limiter 204, the housing 204a and the shaft 204b slip. This restricts transmission of torque. The torque limiter 204 is rotatably supported by a hinge support plate 209. Since the gear 214 and the housing 204a of the torque limiter 204 are engaged, rotation of the gear 214 rotates the housing 204a in an integrated manner. On the other hand, the shaft 204b of the torque limiter 204 and an operation unit support plate 205 that is bonded to the operation unit 200 are engaged. Thus, rotation of the shaft 204b rotates the operation unit 200 in an integrated manner.

<Volume Sensor>

In a leading edge of the shaft 204b, a volume sensor 207 serving as a first detection unit is disposed via a coupling 206. The volume sensor 207 is also integrated with the shaft 204b of the torque limiter 204 and the operation unit 200. Therefore, rotation of the shaft 204b rotates the volume sensor 207. The volume sensor 207 is a sensor the output voltage of which varies according to a rotation angle. Since the volume sensor 207 integrally rotates with the operation unit 200, an angle of rotation made by the operation unit 200 can be detected based on an output voltage value of the volume sensor 207.

<Photo Sensor>

A photo sensor 210, serving as a third detection unit, illustrated in FIGS. 3B and 4B is used to detect whether the operation unit 200 has reached a home position (FIG. 3) at which the operation unit 200 is in a substantially horizontal state. A photo sensor 211, serving as a second detection unit, illustrated in FIGS. 3B and 4B is used to detect whether the operation unit 200 has reached a maximum rotation position (FIG. 4) that is reached when the operation unit 200 makes maximum rotation. As illustrated in FIG. 3A, the photo sensor 211 includes a light emitting unit 211a that emits light, and a light receiving unit 211b that detects the light emitted from the light emitting unit 211a. When the operation unit 200 is rotated, a sensor flag 213 is also rotated. When the operation unit 200 is rotated to a maximum rotatable angle, the sensor flag 213 is moved to a position between the light emitting unit 211a and the light receiving unit 211b. As a result, the light emitted from the light emitting unit 211a is blocked by the sensor flag 213, so that the photo sensor 211 can detect that the operation unit 200 has made maximum rotation within a rotatable range. FIG. 4B illustrates a positional relationship between the operation unit 200, the photo sensor 211, and the sensor flag 213 when the operation unit 200 has made maximum rotation.

Similar to the photo sensor 211, the photo sensor 210 includes a light emitting unit and a light receiving unit (not illustrated). The light emitted from the light emitting unit (not illustrated) is blocked by a sensor flag 212, so that the photo sensor 210 can detect that the operation unit 200 has reached the home position. FIG. 3B illustrates a positional relationship between the operation unit 200, the photo sensor 210, and the sensor flag 212 when the operation unit 200 is at the home position.

<Human Detection Sensor, ID Information Reader Unit>

The human detection sensor 280 serving as a fourth detection unit is disposed on the left side of the operation unit 200 in FIGS. 2A and 2B. The human detection sensor 280 detects an infrared ray emanating from a human body to detect movement of a person near the image forming apparatus 100. In FIGS. 2A and 2B, the ID information reader unit 208 as a reader unit is disposed on the left side of the human detection sensor 280. The ID information reader unit 208 reads user ID information of an ID card when the user holds the ID card over the ID information reader unit 208. The image forming apparatus 100 determines whether automatic tilt operation of the operation unit 200 is necessary, or determines an angle of the operation unit 200 (amount of rotation of the operation unit 200) at the time of the automatic tilt operation, based on the read user identification information of the ID card.

<Control System for Tilt Mechanism>

Figure 5:
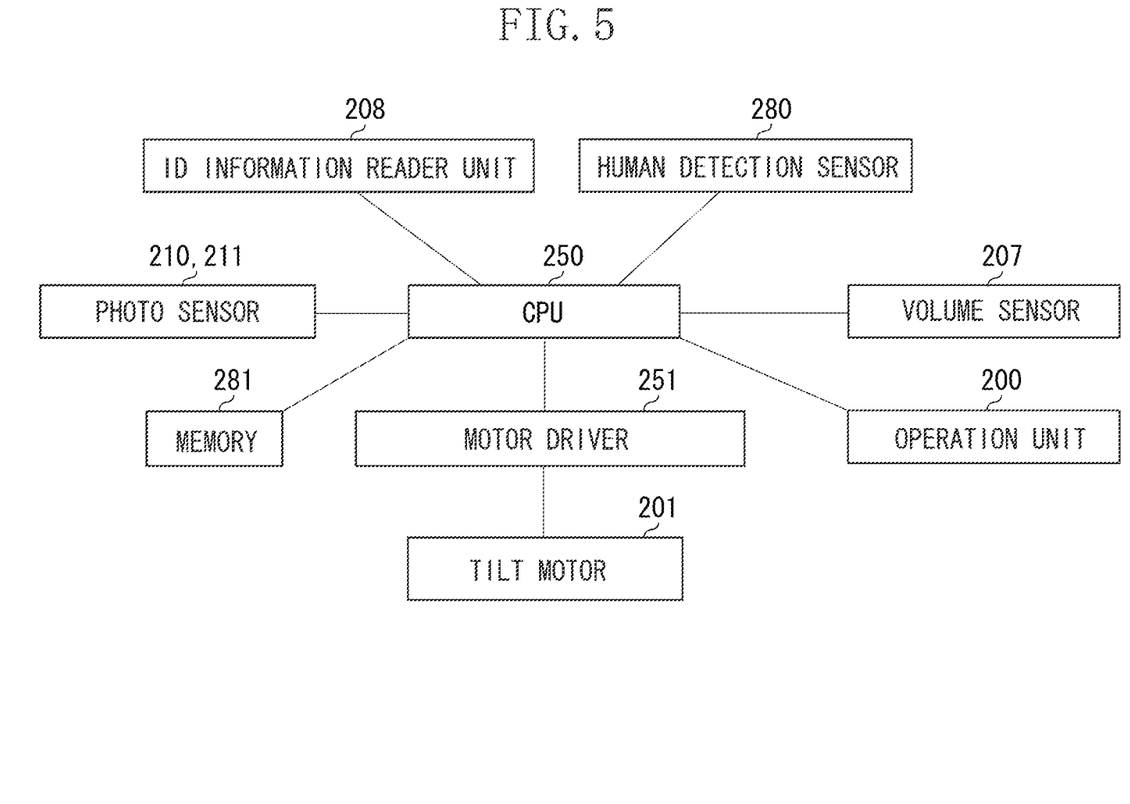
FIG. 5 is a control block diagram illustrating the tilt mechanism according to an exemplary embodiment.

Next, a control system for the tilt mechanism of the operation unit 200 according to the present exemplary embodiment is described with reference to FIG. 5. FIG. 5 is a control block diagram illustrating the control system including a sensor and a drive unit related to control of the tilt mechanism of the operation unit 200 in the image forming apparatus 100. A central processing unit (CPU) 250 serving as a control unit controls the image forming apparatus 100. More specifically, the CPU 250 controls, for example, an image forming operation performed by the image-forming unit 140, a display of information on the operation unit 200, input and output of data on the operation unit 200, and a document reading operation performed by the document reader unit 150.

As illustrated in FIG. 5, the human detection sensor 280, the ID information reader unit 208, the volume sensor 207, and the photo sensors 210 and 211 described above are connected to the CPU 250, and output various detection signals or read ID information to the CPU 250. Further, the CPU 250 is connected to a non-volatile memory 281 serving as a storage unit, so that necessary information is read from and written in the memory 281. In the memory 281, automatic tilt operation information corresponding to user ID information is stored. The automatic tilt operation information includes the necessity or unnecessity of the automatic tilt operation of the operation unit 200, and information about an angle of the operation unit 200 (amount of rotation of the operation unit 200) at the time of automatic tilt operation. Such automatic tilt operation information is input by, for example, operation of the operation unit 200, and then stored in the memory 281.

Further, the CPU 250 switches between two operation modes of a standby mode and a sleep mode. In the standby mode, an image forming operation can be started promptly in response to a request from the user. However, power consumption in the standby mode is greater than that in the sleep mode. In the sleep mode, a preparation time is necessary before an image forming operation is started. The CPU 250 switches to the sleep mode to save the power consumption when no one is using the image forming apparatus 100, or when a predetermined time has elapsed since execution of the last image forming operation. Further, the CPU 250 includes a timer that measures a time.

The CPU 250 reads out information about automatic tilt operation corresponding to the ID information read by the ID information reader unit 208. Such information is read out from the memory 281. Subsequently, the CPU 250 transmits an instruction for rotation of the motor 201 (e.g., a rotation direction and a rotation angle of the operation unit 200) to a motor driver 251 based on the automatic tilt operation information read out from the memory 281. The motor driver 251 drives the motor 201 to rotate the operation unit 200 according to the rotation instruction. Further, the CPU 250 determines a position where the operation unit 200 has been rotated based on an output signal indicating a rotation angle from the volume sensor 207 and detection signals from the photo sensors 210 and 211. When the CPU 250 determines that the operation unit 200 has been rotated to a predetermined position based on the detected rotation position, the CPU 250 transmits a stop instruction to the motor driver 251. The motor driver 251 stops the motor 201 according to the stop instruction.

<Tilt Mechanism Control Sequence>

Figure 6:
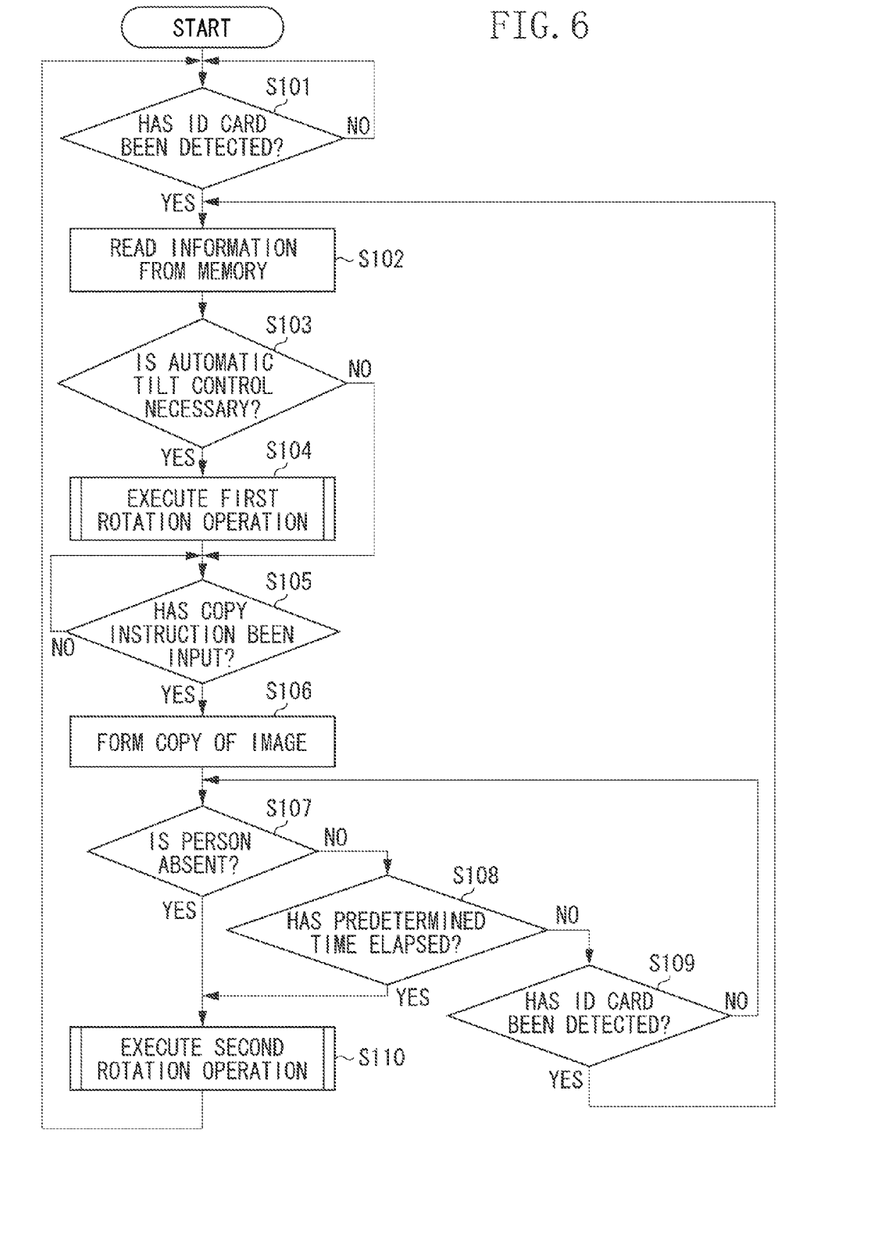
FIG. 6 is a flowchart illustrating a tilt mechanism control sequence performed by the image forming apparatus according to an exemplary embodiment.

A description is given of a control operation for the tilt mechanism of the operation unit 200 at the time of image formation according to the present exemplary embodiment. FIG. 6 is a flowchart illustrating a tilt mechanism control sequence in the image forming apparatus 100. Such a control sequence is started when power of the image forming apparatus 100 is turned on, and is executed by the CPU 250. The flowchart illustrated in FIG. 6 describes the tilt mechanism control operation performed at the time of image formation. Since the image forming operation performed by the image forming apparatus 100 has been described with reference to FIG. 1, the description thereof is omitted here.

In step S101 of the flowchart illustrated in FIG. 6, the CPU 250 determines whether an ID card has been read by the ID information reader unit 208 (i.e., the CPU 250 determines whether an ID card has been detected). If the CPU 250 determines that the ID card has been read (YES in step S101), the processing proceeds to step S102. If the CPU 250 determines that the ID card has not been read (NO in step S101), the processing returns to step S101. In step S102, the CPU 250 reads out automatic tilt operation information (the necessity or unnecessity of the automatic tilt operation and information about an amount of rotation to be made by the operation unit 200 at the time of automatic tilt operation) from the memory 281. The automatic tilt operation information corresponds to the ID information notified from the ID information reader unit 208. In step S103, the CPU 250 determines whether the automatic tilt control of the operation unit 200 is necessary based on the automatic tilt operation information, which is read out in step S102. If the CPU 250 determines that the automatic tilt control is necessary (user ID indicates the necessity of the automatic tilt control) (YES in step S103), the processing proceeds to step S104. If the CPU 250 determines that the automatic tilt operation is not necessary (user ID indicates the unnecessity of the automatic tilt control) (NO in step S103), the processing proceeds to step S105.

In step S104, the CPU 250 executes a first rotation operation to rotate the operation unit 200 based on the information about an amount of rotation to be made by the operation unit 200 at the time of automatic tilt operation. The first rotation operation will be described in detail below. The information about an amount of rotation to be made by the operation unit 200 at the time of automatic tilt operation is stored beforehand in the memory 281. Such information includes custom position information (e.g., information of a position illustrated in FIG. 4A or 4B) corresponding to the user ID, and can be individually set from the operation unit 200.

In step S105, the CPU 250 determines whether a copy instruction has been input from the operation unit 200. If the CPU 250 determines that the copy instruction has been input (YES in step S105), the processing proceeds to step S106. If the CPU 250 determines that the copy instruction has not been input (NO in step S105), the processing returns to step S105. In step S106, the CPU 250 reads a document by using the document reader unit 150, and performs image formation with respect to a sheet S based on image information of the read document (i.e., a copy of an image is formed). Upon completion of the image formation, the CPU 250 resets and starts the timer, and the processing proceeds to step S107.

In step S107, the CPU 250 determines whether a person is absent in the vicinity of the image forming apparatus 100 based on a detection result acquired by the human detection sensor 280. If the CPU 250 determines that a person is absent (YES in step S107), the processing proceeds to step S110. If the CPU 250 determines that a person is present (NO in step S107), the processing proceeds to step S108. In step S108, the CPU 250 determines whether a predetermined time has elapsed since completion of the image forming operation. If the CPU 250 determines that the predetermined time has elapsed (YES in step S108), the processing proceeds to step S110. If the CPU 250 determines that the predetermined time has not elapsed (NO in step S108), the processing proceeds to step S109. In step S109, the CPU 250 determines whether an ID card has been read by the ID information reader unit 208 (i.e., the CPU 250 determines whether an ID card has been detected). If the CPU 250 determines that the ID card has been read (YES in step S109), the processing returns to step S102. If the CPU 250 determines that the ID card has not been read (NO in step S109), the processing returns to step S107.

In step S110, the CPU 250 executes a second rotation operation to rotate the operation unit 200 to a home position. The second rotation operation will be described in detail below. When the CPU 250 finishes the second rotation operation, the processing returns to step S101.

<First Rotation Operation>

Figure 7:
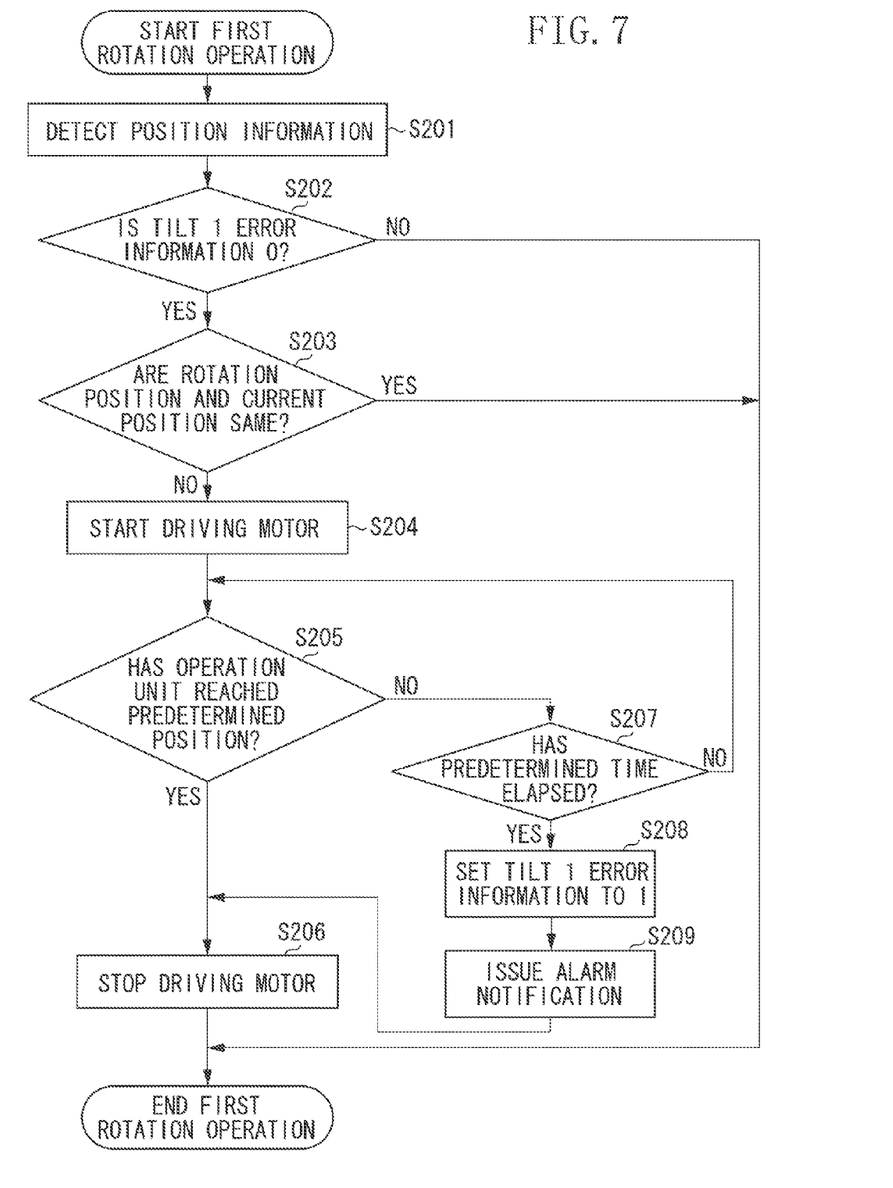
FIG. 7 is a flowchart illustrating a control sequence of a first rotation operation according to an exemplary embodiment.

A control operation for rotating the operation unit 200 to a custom position corresponding to user ID is described with reference to the drawings. FIG. 7 is a flowchart illustrating a tilt mechanism control sequence for rotating the operation unit 200 to a predetermined position corresponding to user ID. The flowchart illustrated in FIG. 7 is started at the time of execution of step S104 illustrated in FIG. 6, and is executed by the CPU 250.

In step S201, the CPU 250 detects a current rotation position (position information) of the operation unit 200 based on an output voltage of the volume sensor 207 and detection signals of the photo sensors 210 and 211. In step S202, the CPU 250 reads out tilt 1 error information from the memory 281 to determine whether the rotation of the operation unit 200 by the rotation operation control is in a non-error state (i.e., the CPU 250 determines whether the tilt 1 error information is "0"). In an error state, the operation unit 200 cannot be rotated to a predetermined position by the rotation operation control. If the CPU 250 determines that the rotation of the operation unit 200 is in the error state (NO in step S202), the rotation operation of the operation unit 200 is not performed and the processing returns to the flowchart illustrated in FIG. 6. If the CPU 250 determines that the rotation of the operation unit 200 is in the non-error state (YES in step S202), the processing proceeds to step S203. Herein, the tilt 1 error information of "0" indicates that the operation unit 200 can be rotated to the predetermined position (i.e., no error) by the rotation operation control, whereas the tilt 1 error information of "1" indicates that the operation unit 200 cannot be rotated to the predetermined position (i.e., error state). The term "error state" used herein represents a state in which the operation unit 200 cannot be rotated to a position corresponding to user ID due to, for example, interference with a large book document when the large book document contacts the operation unit 200 by projecting from the document reader unit 150.

In step S203, the CPU 250 determines whether the current rotation position of the operation unit 200 detected in step S201 and the rotation amount information (the rotation position information) of the operation unit 200 corresponding to the user ID read in step S102 of FIG. 6 are substantially the same. If the CPU 250 determines that these two pieces of the rotation information are substantially the same (YES in step S203), the control operation for rotating the operation unit 200 is not necessary. Thus, the flowchart illustrated in FIG. 7 ends and the processing returns to the flowchart illustrated in FIG. 6. On the other hand, if the CPU 250 determines that these two pieces of the rotation information are not the same (NO in step S203), the processing proceeds to step S204 so that the rotation of the operation unit 200 is controlled.

In step S204, the CPU 250 instructs the motor driver 251 to start driving the motor 201 to rotate the operation unit 200 to a position corresponding to the user ID, and resets and starts the timer. According to the start instruction issued to the motor driver 251, the motor 201 for tilting the operation unit 200 is driven. When the motor 201 for tilting the operation unit 200 is driven, the operation unit 200 is rotated via the worm gear 202, the step gear 203, the gears 214 and 215, and the torque limiter 204. Such rotation of the operation unit 200 rotates the volume sensor 207 connected to the shaft 204b of the torque limiter 204, and an output voltage value changes according to a rotation angle of the volume sensor 207.

In step S205, the CPU 250 reads the output voltage of the volume sensor 207 to detect the current rotation position of the operation unit 200, and determines whether the operation unit 200 has reached the predetermined position corresponding to the user ID. If the CPU 250 determines that the operation unit 200 has reached the predetermined position (YES in step S205), the processing proceeds to step S206. If the CPU 250 determines that the operation unit 200 has not reached the predetermined position (NO in step S205), the processing proceeds to step S207. If the predetermined position corresponding to the user ID is a home position, the CPU 250 determines whether the operation unit 200 has reached the home position based on the detection signal of the photo sensor 210. On the other hand, if the predetermined position corresponding to the user ID is a maximum rotation position, the CPU 250 determines whether the operation unit 200 has reached the maximum rotation position based on a detection signal of the photo sensor 211. In step S206, the CPU 250 instructs the motor driver 251 to stop driving the motor 201 for tilting the operation unit 200. After the motor 201 is stopped, the flowchart illustrated in FIG. 7 ends and the processing returns to the flowchart illustrated in FIG. 6.

In step S207, the CPU 250 refers to the timer to determine whether a predetermined time (first predetermined time) has elapsed since the beginning of drive of the motor 201. If the CPU 250 determines that the predetermined time has elapsed (YES in step S207), the processing proceeds to step S208. If the CPU 250 determines that the predetermined has not elapsed (within the first predetermined time) (NO in step S207), the processing returns to step S205. In step S208, the CPU 250 sets the tilt 1 error information stored in the memory 281 to "1" (error state), and prohibits execution of a subsequent first rotation operation. In step S209, the CPU 250 issues alarm notification to notify the operation unit 200 that the rotation of the operation unit 200 by the automatic tilt operation could not be made, and also to urge that the operation unit 200 should be manually rotated. Then, the processing proceeds to step S206. Herein, the user may manually rotate the operation unit 200. In such a case, the worm gear 202 as a motor shaft is locked not to be movable. Hence, the step gear 203, the gears 214 and 215, and the housing 204a which mesh with the worm gear 202 are not movable. Accordingly, the shaft 204b of the torque limiter 204 slips, so that the operation unit 200 can be manually rotated.

<Second Rotation Operation>

Figure 8:
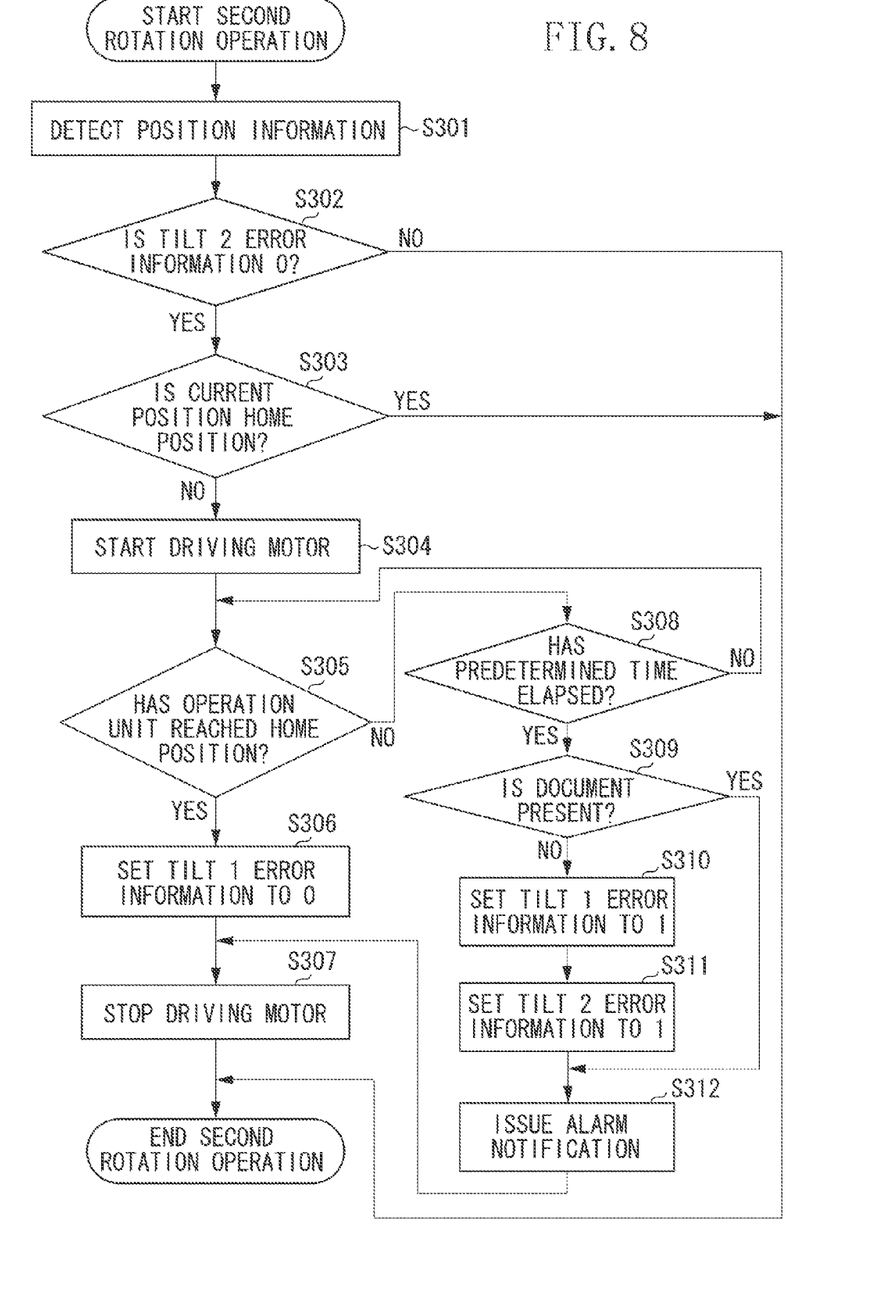
FIG. 8 is a flowchart illustrating a control sequence of a second rotation operation according to an exemplary embodiment.

A control operation for rotating the operation unit 200 to a home position is described with reference to FIG. 8. FIG. 8 is a flowchart illustrating a tilt mechanism control sequence for rotating the operation unit 200 to the home position. The flowchart illustrated in FIG. 8 is started at the time of execution of step S110 illustrated in FIG. 6, and is implemented by the CPU 250.

In step S301, the CPU 250 detects a current rotation position (position information) of the operation unit 200 based on an output voltage of the volume sensor 207 and detection signals of the photo sensors 210 and 211. In step S302, the CPU 250 reads out tilt 2 error information from the memory 281 to determine whether the rotation of the operation unit 200 by the rotation operation control is in a non-error state (i.e., the CPU 250 determines whether the tilt 2 error information is "0"). In an error state, the operation unit 200 cannot be rotated to the home position by the rotation operation control. If the CPU 250 determines that the rotation of the operation unit 200 is in the error state (NO in step S302), the rotation operation of the operation unit 200 is not performed and the processing returns to the flowchart illustrated in FIG. 6. If the CPU 250 determines that the rotation of the operation unit 200 is in the non-error state (YES in step S302), the processing proceeds to step S303. Herein, the tilt 2 error information of "0" indicates that the operation unit 200 can be rotated to the home position (i.e., no error) by the rotation operation control, whereas the tilt 2 error information of "1" indicates that the operation unit 200 cannot be rotated to the home position (i.e., the error state). The term "error state" used herein represents a state where the operation unit 200 cannot be rotated to the home position due to, for example, interference with a large book document when the large book document contacts the operation unit 200 by projecting from the document reader unit 150. In a case where "1" is set to the tilt 2 error information, the CPU 250 does not perform the rotation operation of the operation unit 200. In such a case, the rotation operation is not performed to suppress abnormal sound or a failure due to rotation of the operation unit 200 in a state where the tilt mechanism of the operation unit 200 has a malfunction.

In step S303, the CPU 250 determines whether the current rotation position of the operation unit 200 detected in step S301 is the home position. If the CPU 250 determines that the current rotation position of the operation unit 200 is the home position (YES in step S303), the control operation for rotating the operation unit 200 is not necessary. Thus, the flowchart illustrated in FIG. 8 ends and the processing returns to the flowchart illustrated in FIG. 6. On the other hand, if the CPU 250 determines that the operation unit 200 is not at the home position (NO in step S303), the processing proceeds to step S304 for rotation control of the operation unit 200.

In step S304, the CPU 250 instructs the motor driver 251 to start driving the motor 201 to rotate the operation unit 200 to the home position, and resets and starts the timer. According to the start instruction issued to the motor driver 251, the motor 201 for tilting (rotating) the operation unit 200 is driven. When the motor 201 for tilting the operation unit 200 is driven, the operation unit 200 is rotated via the worm gear 202, the step gear 203, the gears 214 and 215, and the torque limiter 204. Such rotation of the operation unit 200 rotates the volume sensor 207 connected to the shaft 204b of the torque limiter 204, and thus an output voltage value changes according to a rotation angle of the volume sensor 207.

In step S305, the CPU 250 detects the current rotation position of the operation unit 200 based on the output voltage of the volume sensor 207 and detection signals of the photo sensors 210 and 211 to determine whether the operation unit 200 has been rotated and reached the home position. If the CPU 250 determines that the operation unit 200 has reached the home position (YES in step S305), the processing proceeds to step S306. If the CPU 250 determines that the operation unit 200 has not reached the home position (NO in step S305), the processing proceeds to step S308. In step S306, the CPU 250 sets the tilt 1 error information stored in the memory 281 to "0" (no error), and cancels the prohibition of the first rotation operation. Herein, the tilt 1 error information is set to "0" so that the rotation of the operation unit 200 can be tried again to a custom position corresponding to next user ID. In step S307, the CPU 250 instructs the motor driver 251 to stop driving the motor 201 for tilting the operation unit 200. After the motor 201 is stopped, the flowchart illustrated in FIG. 8 ends and the processing returns to the flowchart illustrated in FIG. 6.

In step S308, the CPU 250 determines whether a predetermined time (second predetermined time) has elapsed since the beginning of drive of the motor 201. If the CPU 250 determines that the predetermined time has elapsed (YES in step S308), the processing proceeds to step S309. If the CPU 250 determines that the predetermined time has not elapsed (within the second predetermined time) (NO in step S308), the processing returns to step S305. The operation unit 200 may not have reached the home position within the predetermined time. In such a case, in step S309, the CPU 250 determines whether a document has been set on the document reader unit 150 based on a detection result acquired by the document size sensor (i.e., the CPU 250 determines whether a document is present). If the CPU 250 determines that the document has not been set based on the detection result acquired by the document size sensor (NO in step S309), the processing proceeds to step S310. If the CPU 250 determines that the document has been set (YES in step S309), the processing proceeds to step S312. Such processing is performed so that the CPU 250 checks that a large book document is not present on the document reader unit 150 and there is no interference with the operation unit 200. Further, before the second rotation operation is performed, such processing enables the CPU 250 to check that a person is absent (step S107 in FIG. 6) by using the human detection sensor 280, or to determine that a user is not present near the image forming apparatus 100 as the predetermined time has elapsed (step S108 in FIG. 6). Therefore, the CPU 250 can determine that the operation unit 200 is not in a state where, for example, a user hand or a user arm contacts the operation unit 200 and applies a load to the operation unit 200.

The operation unit 200 may not have been rotated to the home position within the predetermined time in spite of the absence of the document. In such a case, in step S310, the CPU 250 determines that a malfunction has occurred in the tilt mechanism of the operation unit 200. The CPU 250 sets the tilt 1 error information stored in the memory 281 to "1" (the error state). Subsequently, in step S311, the CPU 250 sets the tilt 2 error information stored in the memory 281 to "1" (error state). Consequently, a subsequent rotation operation of the operation unit 200 by the CPU 250 is not executed. In step S312, the CPU 250 issues alarm notification to notify the operation unit 200 that the rotation of the operation unit 200 to the home position could not be made, but also to urge that operation unit 200 should be manually rotated. Then, the processing proceeds to step S307. When normal operation of the tilt mechanism of the operation unit 200 is confirmed, each of the tilt 1 error information and the tilt 2 error information is set to "0" (no error) by an error cancelation procedure performed from the operation unit 200.

According to the present exemplary embodiment described above, in a case where rotation of the operation unit 200 from a home position as a standby position in a sleep mode to a user operating position is not normally made due to, for example, interference with a large book document, such rotation is not tried again. Then, the operation unit 200 is rotated toward the standby position at a predetermined timing, for example, when the human detection sensor 280 detects the absence of a person, after an image is formed, or after a predetermined time has elapsed since the last user-operation. Further, in a case where an automatic operation for rotating the operation unit 200 to the standby position is not normally completed due to any reason, any automatic operation of the operation unit 200 is not performed. This suppresses abnormal sound, damage to a document, and degradation in usability caused by inappropriate automatic operation of the operation unit 200.

According to the present exemplary embodiment, therefore, damage to a document and abnormal sound at the time of automatic rotation of the operation unit can be suppressed.

According to the present disclosure, damage to a document and abnormal sound at the time of automatic rotation of the operation unit can be suppressed.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-245099, filed Dec. 16, 2015, which is hereby incorporated by reference herein in its entirety.

What is claimed is:

1. An image forming apparatus configured to form an image on a sheet comprising:
  a main body frame;
  an operation unit configured to display information and receive an input of data;
  a rotation shaft configured to support the operation unit and rotate with respect to the main body frame;
  a drive motor configured to rotate the rotation unit, wherein the motor causes the operation unit to rotate between a home position and a position other than the home position by rotating the rotation shaft;
  a detection sensor configured to detect a rotation position of the operation unit rotating between the home position and the position other than the home position;
  an information reader configured to read user identification information of an ID card;
  a processor configured to execute a first rotation operation and a second rotation operation in response to the information reader read user identification information, the first rotation operation is to rotate the motor based on the user identification information such that the operation unit rotates from the home position to a position corresponding to the user identification information, and the second rotation operation is to rotate the motor such that the operation unit rotates back to the home position from the position other than the home position,
  wherein the processor stops the first rotation operation in response to the detection sensor detecting the operation unit not rotating for a predetermined period of time and not rotating to a position corresponding to the user identification information while executing the first rotation operation, and executes the second rotation operation in a case where the detection sensor detected the operation unit not positioning at the home position after stopping the first rotation operation.

2. The image forming apparatus according to claim 1, further comprising:
  a storage unit configured to store information regarding a rotation amount of the operation unit rotating from the home position by correlating the information with the user identification information,
  wherein the processor executes the first rotation operation based on the information regarding the rotation amount and associated with the user identification information.

3. The image forming apparatus according to claim 1, wherein, if the first rotation operation is not finished within the predetermined time, the processor issues an alarm notification.

* * * * *